United States Patent [19]
Nakatani et al.

[11] Patent Number: 5,387,984
[45] Date of Patent: Feb. 7, 1995

[54] FACSIMILE TRANSMISSION METHOD OF TRANSFERRING A MULTI-COLOR ORIGINAL IMAGE AND APPARATUS THEREOF

[75] Inventors: Munehiro Nakatani, Toyohashi; Masamichi Sugiura; Akio Nakajima, both of Toyokawa; Hideo Muramatsu, Shinshiro, all of Japan

[73] Assignee: Minolta Camera Kabushiki Kaisha, Osaka, Japan

[21] Appl. No.: 904,592

[22] Filed: Jun. 26, 1992

[30] Foreign Application Priority Data

Jul. 16, 1991 [JP] Japan .................................. 3-202497

[51] Int. Cl.⁶ .............................................. H04N 1/00
[52] U.S. Cl. .................................................. 358/439
[58] Field of Search ............... 358/400, 401, 405, 434, 358/435, 436, 438, 439, 468; 340/700, 701; 379/100

[56] References Cited

U.S. PATENT DOCUMENTS

| | | | |
|---|---|---|---|
| 4,682,215 | 7/1987 | Adachi . | |
| 4,712,139 | 12/1987 | Kato | 358/257 |
| 4,862,250 | 8/1989 | Takei et al. | 358/12 |
| 4,862,254 | 8/1989 | Takada | 358/75 |
| 5,187,592 | 2/1993 | Sugiyama et al. | 358/430 |
| 5,251,020 | 10/1993 | Sugiyama | 358/500 |
| 5,276,509 | 1/1994 | Mizuno et al. | 358/500 |

FOREIGN PATENT DOCUMENTS 62-136171  6/1987  Japan .
62-285574 12/1987  Japan .
2-63374   3/1990  Japan .

Primary Examiner—Bentsu Ro
Attorney, Agent, or Firm—Burns, Doane, Swecker & Mathis

[57] ABSTRACT

A facsimile transmission method according to the present invention is a facsimile transmission method of transferring a color image from a sending station to a receiving station through a communication line; the method including the steps of: reading an image of a colored original, generating a plurality of image data corresponding to predetermined color components respectively, and storing the image data in a memory at the sending station before calling up the receiving station; calling up the receiving station and determining a color printing ability of the receiving station; and sending appropriate image data from the sending station to the receiving station in accordance with the color printing ability of the receiving station.

27 Claims, 13 Drawing Sheets

FACSIMILE TRANSMISSION METHOD OF TRANSFERRING A MULTI-COLOR ORIGINAL IMAGE AND APPARATUS THEREOF

BACKGROUND OF THE INVENTION

1. Field of the Invention

The present invention relates to a facsimile transmission method, and more particularly, to a transmission method having a feature in the manner of transmitting image information corresponding to a multi-color original, and an apparatus thereof.

2. Description of the Related Art

A facsimile apparatus of a type sequentially transmitting image information in parallel with the readout scanning of the original image, more specifically, a facsimile apparatus that initiates scanning operation of reading an original image after accessing a receiving station from a sending station via a communication line (generally a telephone line) and establishing a transmission enable state (i.e. after a calling operation), is known. Some of these facsimile apparatus are known to allow transmission/reception of a multi-color image (a two-colored image of black and red, for example) in addition to the transmission/reception of a normal single color image.

One of these facsimile apparatus is disclosed in Japanese Patent Laying-Open No. 2-63374. In this facsimile apparatus, the function or the state of the destination apparatus (the apparatus of the receiving station) is verified by a predetermined communication protocol before initiating the scanning operation of reading in transmitting an original, followed by the selection of the color of the image read from the original image according to the receiving station.

The mode of the read scanning operation is switched depending whether the apparatus of the receiving station is capable of reducing a multi-color image as the apparatus of the sending station, whereby image information corresponding to a colored image that can be reproduced by the apparatus of the receiving station is transmitted thereto.

In a conventional facsimile apparatus where only a single color image reproduction is allowed, a transmission method is employed of reading and storing an original image as coded data (compressed data) in a memory means prior to the calling operation, and reading out and sending to the receiving station the coded data from the memory means at the time of calling (referred to as "memory transmission method").

The memory transmission method has an advantage of reducing the transmission time (the connecting time of a communication line) in comparison with the method where a read out image information is converted into coded data while being transmitted. There are also advantages of allowing reservation transmission where the transmission time can be specified and sequential broadcasting (multi-calling) transmission where the same original can be sequentially transmitted to a plurality of destinations.

SUMMARY OF THE INVENTION

An object of the present invention is to provide a facsimile transmission method of transmitting efficiently an image of a multi-color original, and an apparatus thereof.

Another object of the present invention is to provide a facsimile transmission method of reading out a multi-color original and storing the image data prior to the calling operation, and transmitting the stored data at the time of calling, and an apparatus thereof.

The above objects are achieved by a facsimile transmission method and an apparatus thereof that reads out a multi-color original to generate image data for each color and storing these data into a memory device, followed by a calling operation of a receiving station to make determination of the color printing function of the apparatus thereof, and transmitting appropriate image data according to the printing function of the receiving station.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
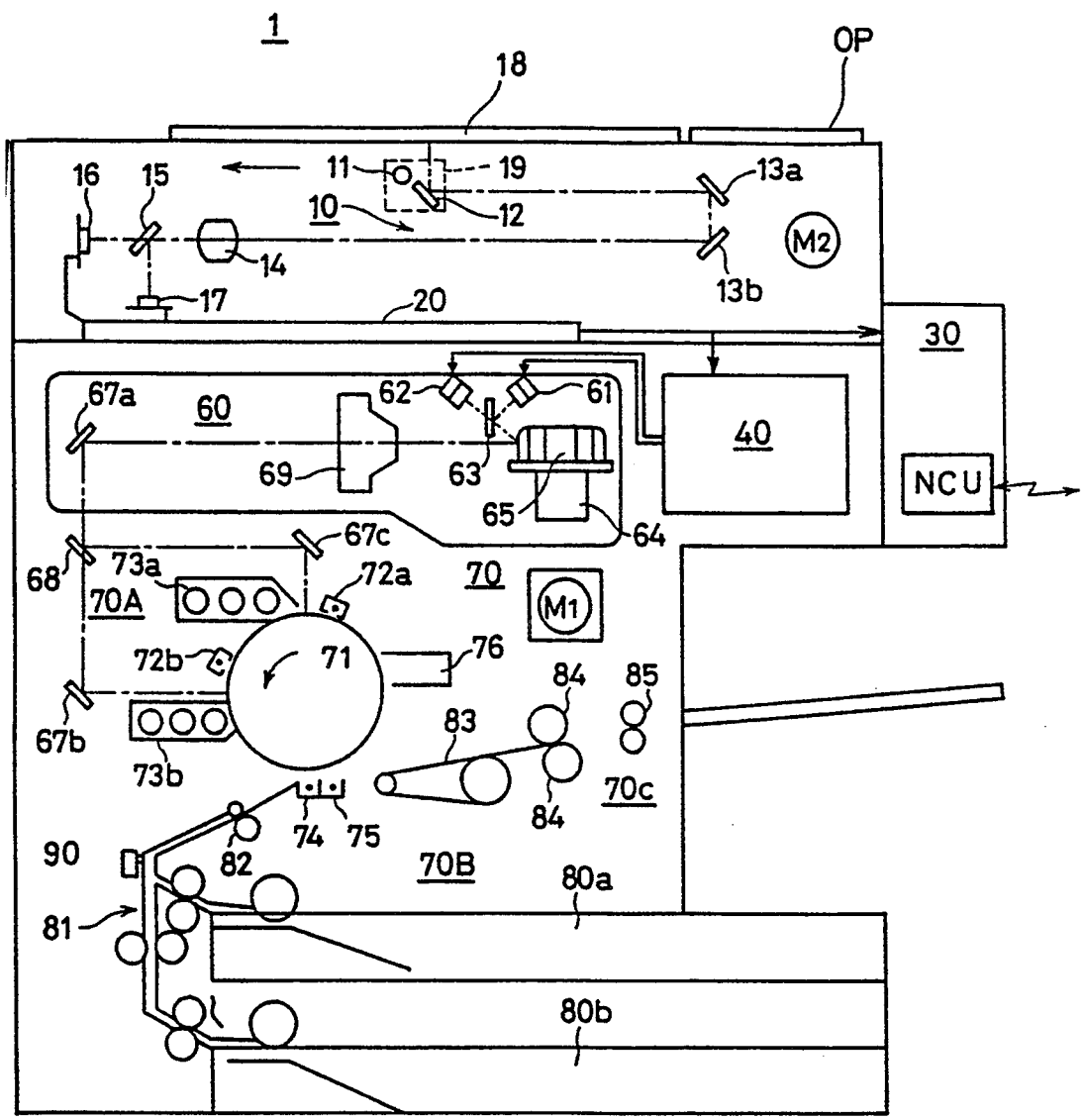
FIG. 1 is a sectional front view showing the entire structure of a facsimile apparatus.
Figure 2:
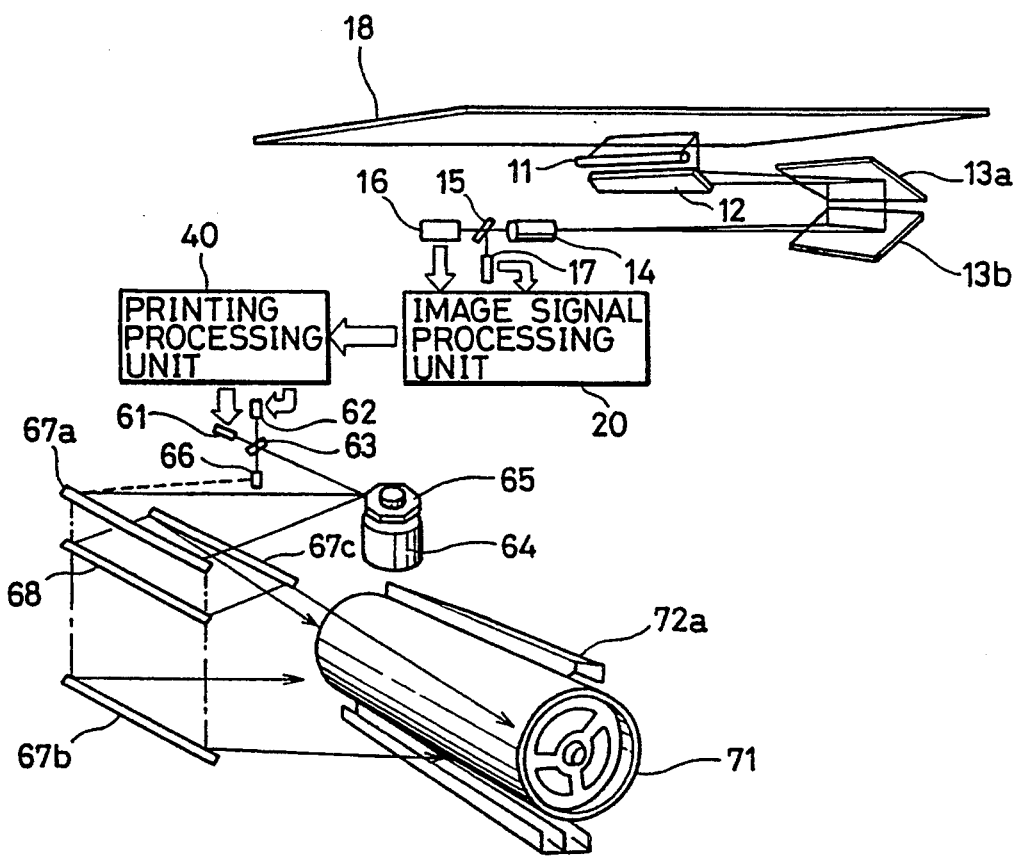
FIG. 2 is a schematic perspective view showing the structure of main components shown in FIG. 1.
Figure 3:
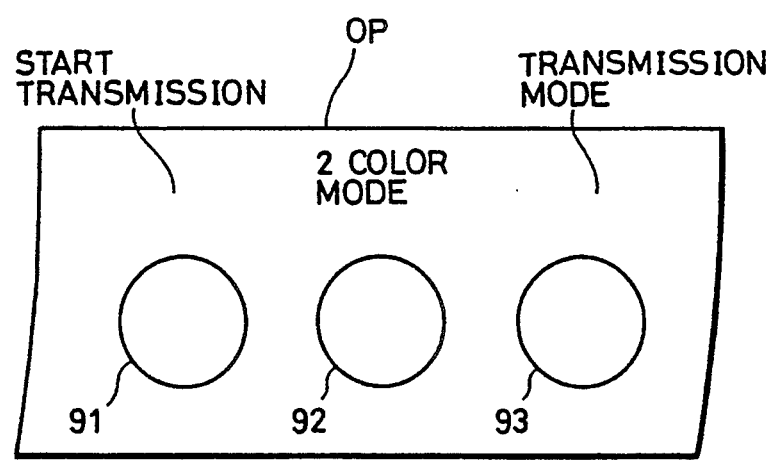
FIG. 3 is a plan view showing the components of the operation panel.

FIG. 1 is a sectional front view showing the entire structure of a facsimile apparatus 1 and FIG. 2 is a schematic perspective view showing the structure of main components shown in FIG. 1.

Referring to FIGS. 1 and 2, a facsimile apparatus 1 includes a scanning system 10 for reading out and converting an original into electric signals, an image signal processing unit 20 for processing an image signal provided from scanning system 10, a facsimile transmission unit 30 for transmitting/receiving image information to and from an apparatus of a communication destination not shown, a printing processing unit 40 for driving two semiconductor lasers 61 and 62 according to image data from image signal processing unit 20 and facsimile transmission unit 30, an optical system 60 for directing to an exposure position on a photoreceptor drum 71 the two laser beams from semiconductor lasers 61 and 62 on different exposure positions, and an image forming system 70 for developing a latent image formed by exposure and transferring the image onto a paper sheet and fixing the same. Transmission/reception and copy operation of an image of a multi-color original is possible.

Scanning system 10 includes an exposure lamp 11 and a mirror 12 fixed to a scanner 19 that moves below platen glass 18, movable mirrors 13a, 13b, a focusing lens 14, a dichroic mirror 15, photoelectric conversion devices 16 and 17 using CCD array or the like, and a scan motor M2.

Dichroic mirror 15 reflects light of a certain color such as red from the light reflected from the original and transmits the light of the complementary color of the certain color. Photoelectric conversion devices 16 and 17 converts the image of the non-specific color mainly based on the black color in the original, and also the image of the specific color (red) into electric signals.

Image signal processing unit 20 processes the image signal provided from the two photoelectric conversion devices 16 and 17 and identifies each pixel of the original image into a first color and a second color. Image data with color information is provided to printing processing unit 40.

Printing processing unit 40 distributes the transmitted image data with the color information to semiconductor lasers 61 and 62 according to the contents thereof. Printing processing unit 40 also delays image data to be provided to one of semiconductor laser 63 according to the difference in the exposure position corresponding to the two semiconductor lasers 61 and 62.

Optical system 60 includes a dichroic mirror 63 for combining the two laser beams of semiconductor lasers 61 and 62, a polygon mirror 65 for deflecting the composite laser beam, a motor 64 for driving polygon mirror 65, a main lens 69, a reflecting mirror 67a, a dichroic mirror 68 for separating the composite laser beam into the original two laser beams, and reflecting mirrors 67b and 67c.

Image forming system 70 includes develop transfer system 70A, convey system 70B, and fixation system 70C, whereby simultaneous image formation of two colors is implemented for forming an image of two colors on a paper sheet by one electrophotographic process.

More specifically, develop transfer system 70A includes a photoreceptor drum 71 driven to rotate counter clockwise in the diagram. Develop transfer system 70A further includes a first sensitizing charger 72a, a first developing unit 73a, a second sensitizing charger 72b, a second developing unit 73b, a transfer charger 74, a separation charger 75, and a cleaning unit 76 all disposed around photoreceptor drum 71 in order from the upstream of the rotation direction.

First developing unit 73a accommodates a two-component developer of a red color toner corresponding to the second color and carrier. Second developing unit 73b accommodates a two-component developer of a black color toner corresponding to the first color and carrier.

Conveying system 70B includes cassettes 80a and 80b for storing paper sheets, a sheet guide 81, a timing roller 82, and a transport belt 83. Fixation system 70C includes fixing rollers 84, 84 and a discharge roller 85.

An operation panel OP is provided on the upper face of facsimile apparatus 1. On operation panel OP, a plurality of keys are arranged therein such as a start key 91 for initiating transmission in facsimile communication, a two-color mode key 92 for selecting a two-color mode to read the original as a two-color image, and a transmission mode selection key 93 for switching the transmission mode.

By depressing transmission mode selection key 93 sequentially, three types of modes, i.e. a single color mode, a two-page mode, and a two-color composite mode is selected.

Figure 4:
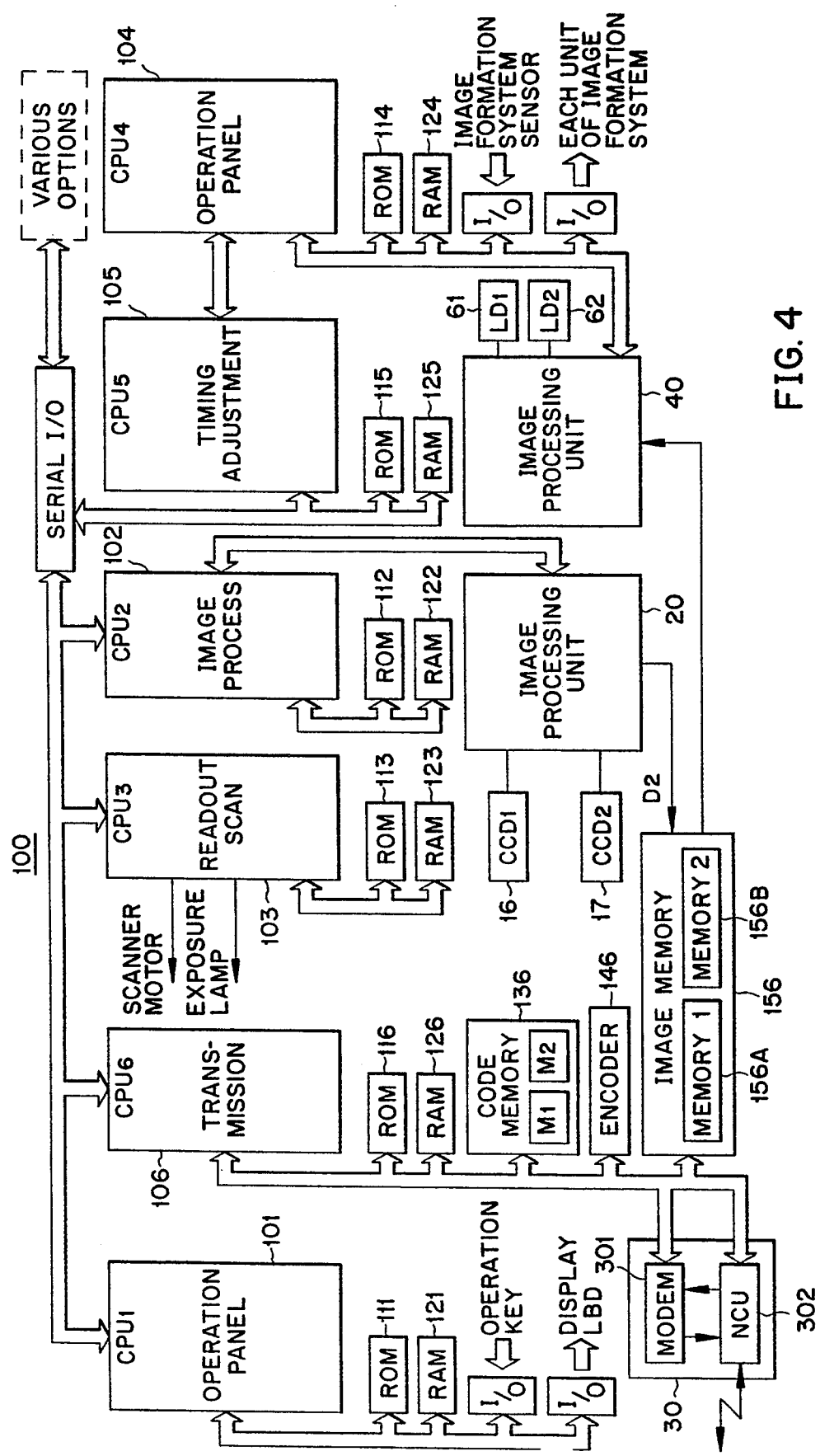
FIG. 4 is a block diagram showing the structure of the controller of the facsimile apparatus.

FIG. 4 is a block diagram showing a structure of controller 100 of facsimile apparatus 1.

Controller 100 is implemented mainly of six CPUs 101, 102, 103, 104, 105, and 106. Each of CPUs 101–106 include ROMs 111, 112, 113, 114, 115, and 116 storing programs, respectively, and RAMs 121, 122, 123, 124, 125, and 126, which become the work area for program execution, respectively.

CPU 101 controls the input and display of a signal from various operation keys on operation panel OP. CPU 102 controls each unit of image signal processing unit 20, and CPU 103 controls the drive of scanning system 10. CPU 104 controls printing processing unit 40, optical system 60, and image forming system 70. CPU 105 carries out the process for the overall timing adjustment of controller 100 and for setting an operation mode. CPU 106 carries out the process accompanying facsimile transmission.

Figure 5:
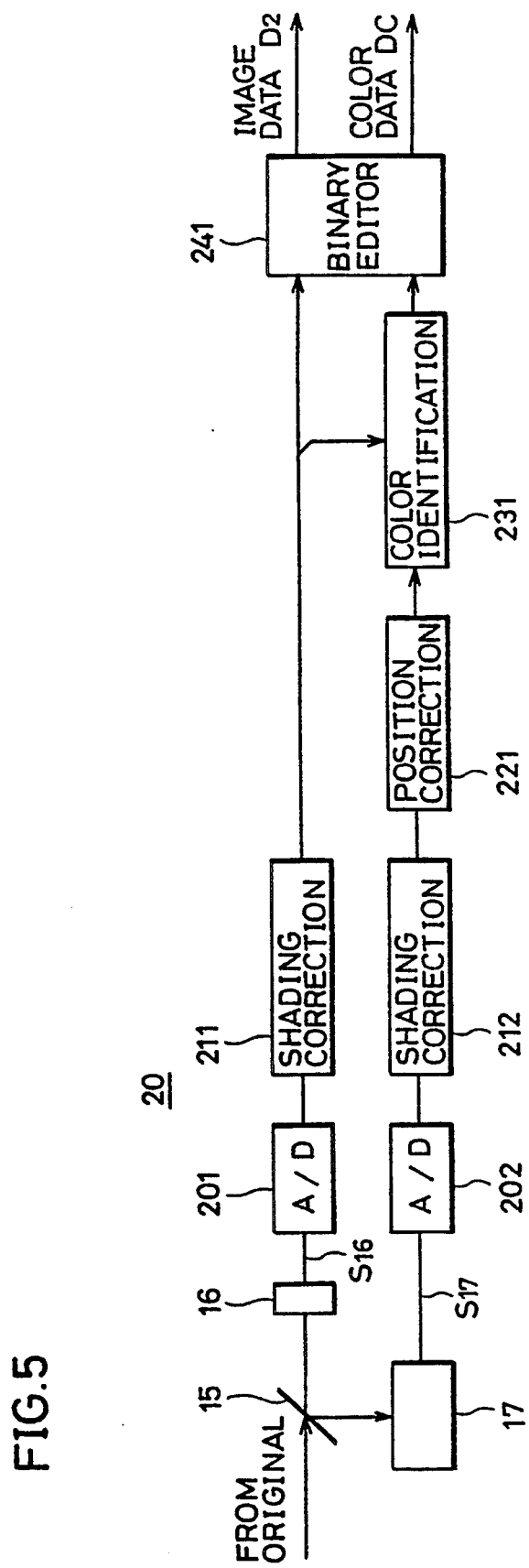
FIG. 5 is a block diagram of an image signal processing unit.

FIG. 5 is a block diagram of an image signal processing unit 20.

Image signal processing unit 20 includes A/D converters 201 and 202 for quantizing photoelectric conversion signals S16 and S17 of photoelectric conversion devices 16 and 17 into image data of a predetermined number of bits, shading correcting units 211 and 212 for correcting unevenness in the light distribution of exposure lamp 11 and for correcting difference in sensitivity between pixels of photoelectric conversion devices 16 and 17, a position correcting unit 221 constituted by a line memory for correcting position offset in the subscanning direction of each image data, a color verification ROM 231 for verifying the color of the pixel of the original according to each image data, and a binary editor 241 for providing image data D2 to which an image data corresponding to photoelectric conversion signal S16 is binarized and color data DC corresponding thereto.

Figure 6:
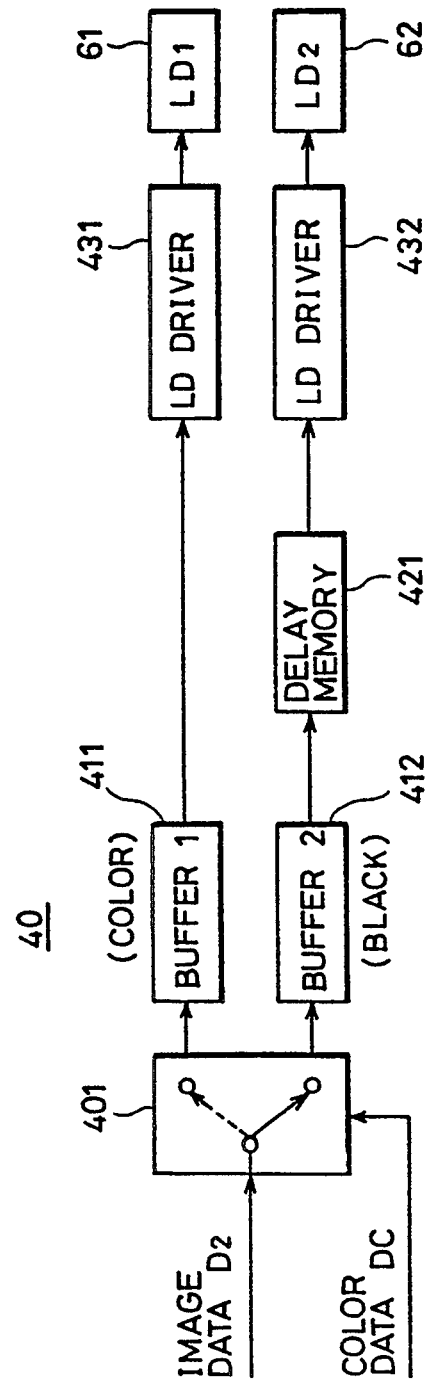
FIG. 6 is a block diagram of a printing processing unit

FIG. 6 is a block diagram of printing processing unit 40.

Printing processing unit 40 includes color separation selector 401 for switching the output destination of image data D2 according to color data DC, two buffers 411 and 412, a delay memory 421, and LD drivers 431 and 432 for driving semiconductor lasers 61 and 62.

When image data D2 corresponds to the second color (red), image data D2 is provided to LD driver 431 via buffer 411 from color separation selector 401, whereby control of the drive of semiconductor laser 61 is carried out. When image data D2 is the first color (black), image data D2 is sent to LD driver 432 via buffer 411 and delay memory 421, according to a delay depending on the difference in the exposure position on photoreceptor drum 71, whereby control of the drive of semiconductor laser 62 is carried out.

Facsimile apparatus 1 of the above-described structure carries out facsimile transmission according to the memory transmission method. In facsimile transmission, a scanning operation of reading out an original is carried out prior to the calling operation, and image data D2 provided from image signal processing unit 20 is stored in image memory 156 (refer to FIG. 4). Concurrently image data D2 is coded (compressed) by an encoder 146 by a MH system (standard system of G3). The compressed data is stored in a code memory 136 as the image information to be transmitted. Encoder 146 functions as a data compressing device for coding an input image data, as well as a data expanding device for decoding and expanding an input coded compressed signal.

A destination apparatus (apparatus of the receiving station) is called up by an NCU (Network Control Unit) 302 of facsimile transmission unit 30. Upon the receiving station entering a receiving enable state, the compressed data read out from code memory 136 is modulated by a modem 301 to be transmitted to a communication line.

As described above, facsimile apparatus 1 is capable of transmitting/receiving a multi-color image where a black image and a red image are mixed. Image information can be exchanged between facsimile apparatus 1 and another facsimile apparatus having the same structure.

Figure 7:
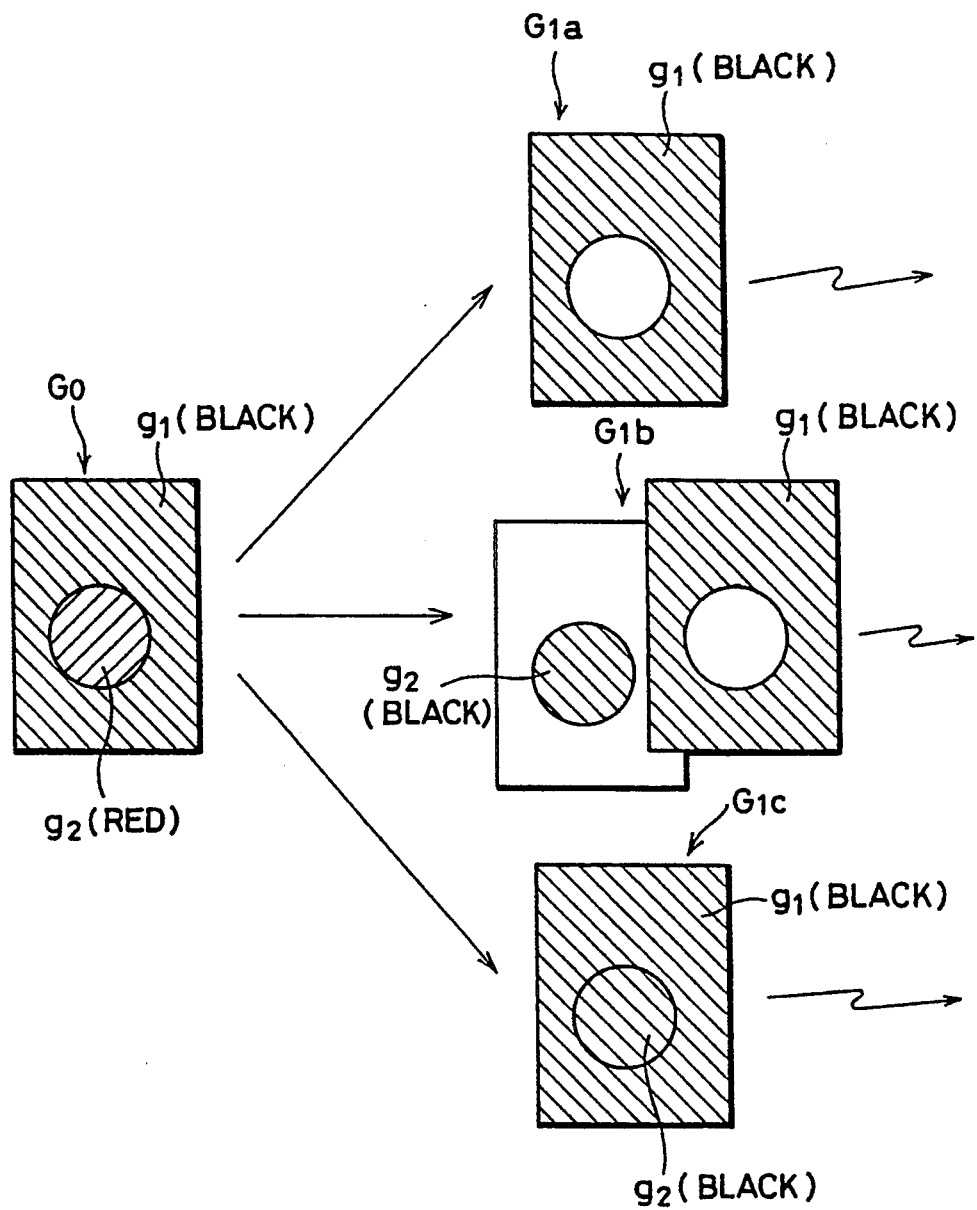
FIG. 7 is a schematic diagram for describing the transmission Of image information in various modes.

As shown in FIG. 7, any of the transmission modes of a single color mode, a two page mode, and a composite mode is selected when the apparatus of the receiving station is only capable of reproducing an image of a single color (normally black) even though the original image G0 to be sent is a two-color image of a black image g1 and a red image g2.

When a single color mode is selected, image G1a is reproduced at the apparatus of the receiving station constituted by only image g1 with the red image g2 as a blank.

When a two-page mode is selected, black image g1 and red image g2 are sequentially transmitted. At the apparatus of the receiving station, two pages of the original image are received, whereby image G1b is reproduced as a format of separate images of g1 and g2 in separate pages.

When a composite mode is selected, the two-color original image G0 is accepted as if it was a single color image, whereby original image G0 is reproduced in single color as image G1c.

The operation of CPU 106 will be described with reference to the flow chart for controlling facsimile transmission.

Figure 8:
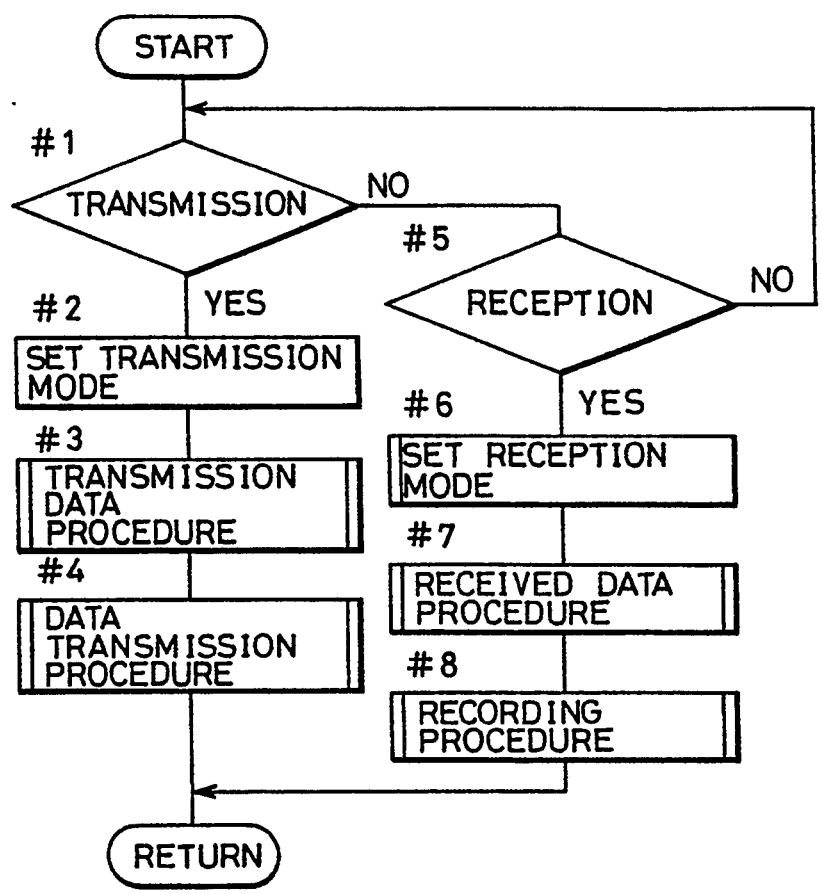
FIG. 8 is a main flow chart showing the schematic operation of a CPU controlling the facsimile transmission.

FIG. 8 is a main flow chart schematically showing the operation of CPU 106.

When transmission is to be carried out, the operation mode is set to a transmission mode, and a transmission data procedure and a data transmitting procedure are carried out sequentially (step #1–step #4).

When reception is to be carried out, the operation mode is set to a receiving mode, and a receiving data procedure and a recording procedure are carried out sequentially (step #5–step #8).

Figure 9:
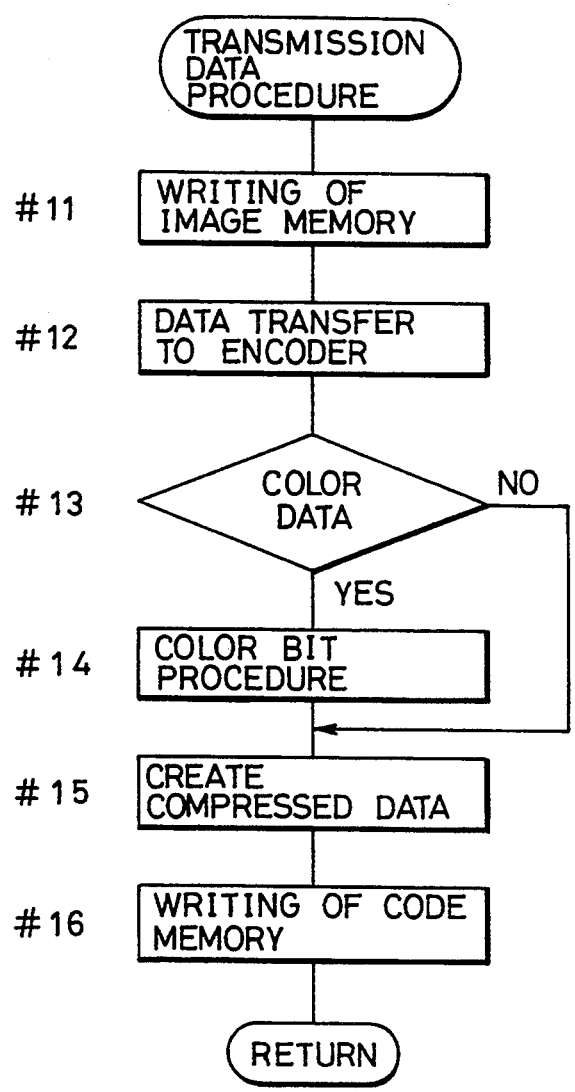
FIG. 9 is a flow chart of a transmission data procedure.

FIG. 9 is a flow chart of a transmission data procedure.

Image data D2 provided from image signal processing unit 20 is written into image memory 156 for each pixel (step #11). If the pixel is black, the data is written into a first memory region 156A. If the pixel is red, the data is written into a second memory region 156B. The data written into first memory region 156A is called the first image data, and the data written into second memory region 156B is called the second image data.

Each of memory regions 156A and 156B has a capacity of 500 kilobytes, and is capable of storing image data D2 reading out an original of A4 size in fine mode [(8 pixels/mm)×(7.7 pixels/mm)].

Then, the data is transferred to encoder 146 from image memory 156 (step #12). At step #13, the type of the transmitted image data is identified. The first image data is coded by encoder 146 at step #15 to become the first compressed data. The second image data is subjected to a color bit procedure for adding information associated with the reproduced primary color of the image at step #14, followed by a coding process by encoder 146 to become the second compressed data. The first and second compressed data are written into code memory 136 at step #16.

Figure 10:
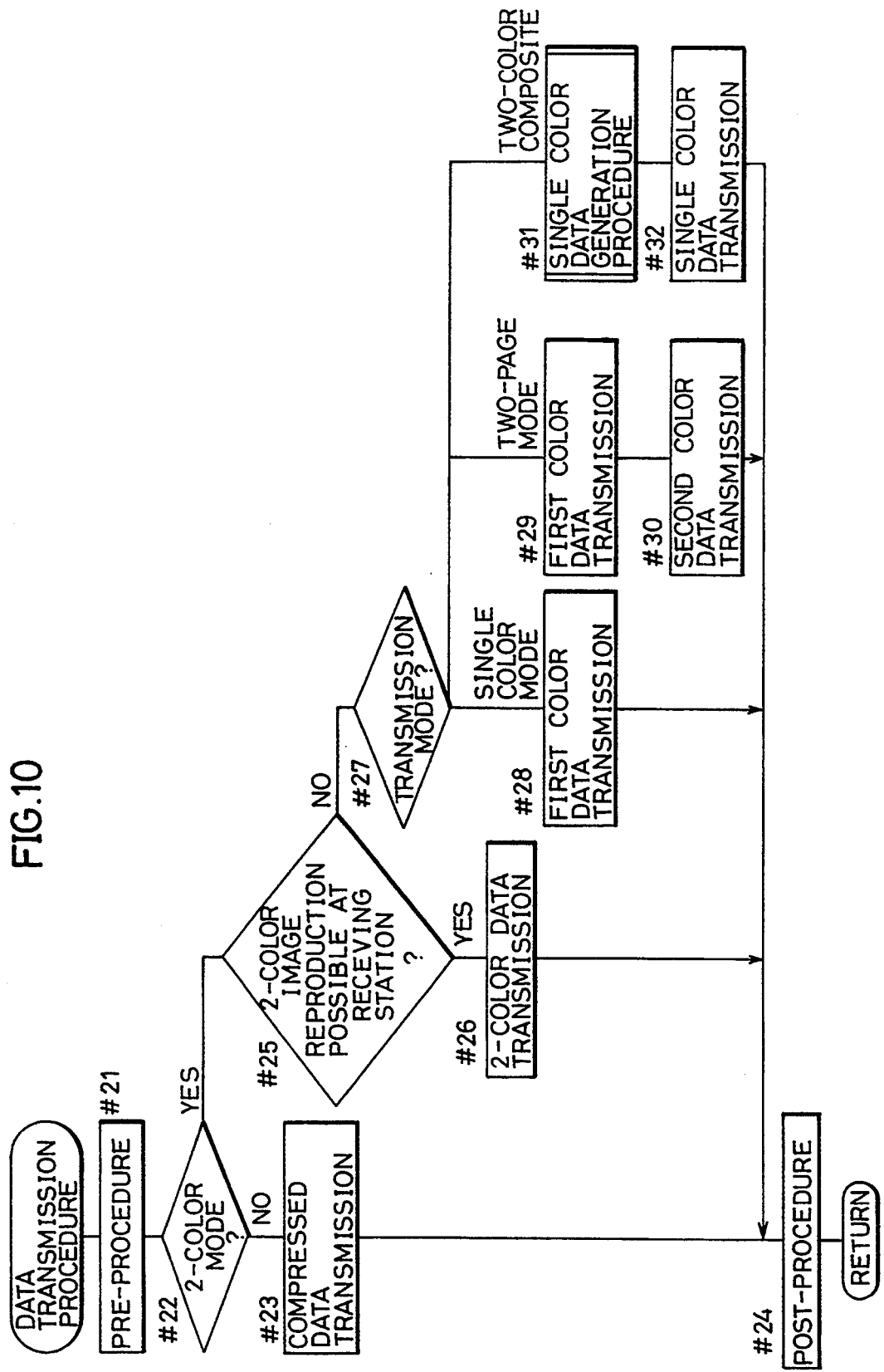
FIG. 10 is a flow chart of a data transmitting procedure.

FIG. 10 is a flow chart of a data transmitting procedure. This procedure is executed after the completion of the transmission data procedure (step #3).

In the pre-procedure (step #21), the apparatus of the receiving station (referred to as "receiving station" hereinafter) by NCU 302 is called up to identify the state of the receiving station. Then, at step #22, a check is made whether the above-mentioned two-color mode is selected by two-color mode key 92.

If not in the two-color mode, first compressed data is read out and transmitted from code memory 136 (step #23), followed by the execution of the post-procedure for canceling the line connection with the receiving station (step #24).

If in the two-color mode, a check is made whether the reproduction of a two-color image is allowed or not at the receiving station (step #25). If YES at step #25, the compressed data corresponding to the two-color image (first compressed data and second compressed data) are transmitted (step #26).

The information that the transmitted compressed data is a two-color image is notified to the receiving station by an NSS signal (Non-Standard Function Specify Signal) determined by the communication protocol.

If NO at step #25, that is, when only single color reproduction of an image (black) is possible at the receiving station, the transmission mode is checked (step #27) to carry out the following procedure according to the mode.

In the case of a single color mode, the first compressed data is transmitted for reproducing only the black portion of the two-color image as an image of one page (step #28). Here, information that a portion of the image was not transmitted is stored and recorded on a transmission management report that is printed out appropriately.

If in two-page mode, the first compressed data is transmitted as the data for the first page (step #28), followed by the transmission of the second compressed data as the data for the second page.

If in composite mode, the first data and the second data are composited to generate a mono-color data (step #31).

Figure 11:
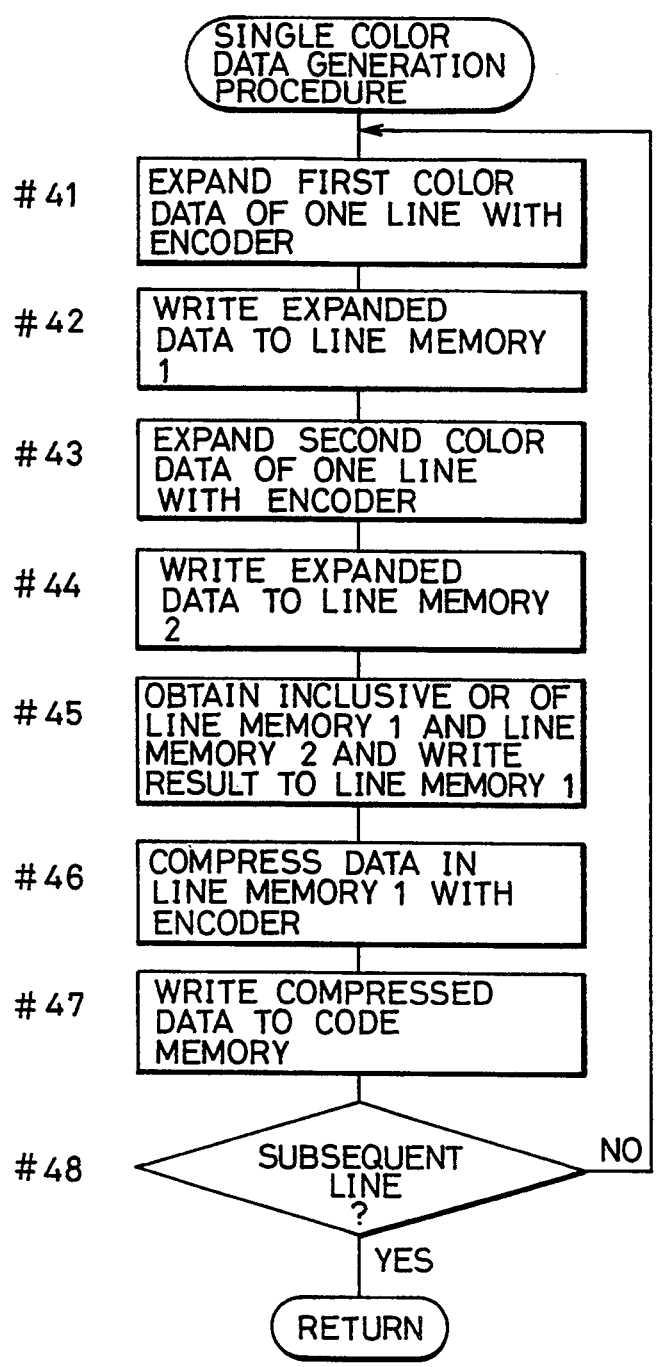
FIG. 11 is a flow chart of a single color data generation procedure.

FIG. 11 is a flow chart of a single color data generation procedure of FIG. 10.

The first compressed data of one line is read out from code memory 136, whereby each pixel of one line is expanded into binary data by encoder 146 (step #41). The expanded data is written into line memory M1 in encoder 146 (step #42).

Then, the second compressed data of one line is read out and expanded from code memory 136 (step #43). The expanded data is written into line memory M2 in encoder 146 (step #44).

An inclusive OR is obtained for each pixel of the expanded data of both line memories in encoder 146. The result is written again into line memory M1 (step

45). The expanded data in line memory M1 is again compressed (step #46) and the compressed data is written into code memory 136 (step #47).

The above-described procedure is carried out for all lines of the first compressed data and the second compressed data (step #48).

Figure 12:
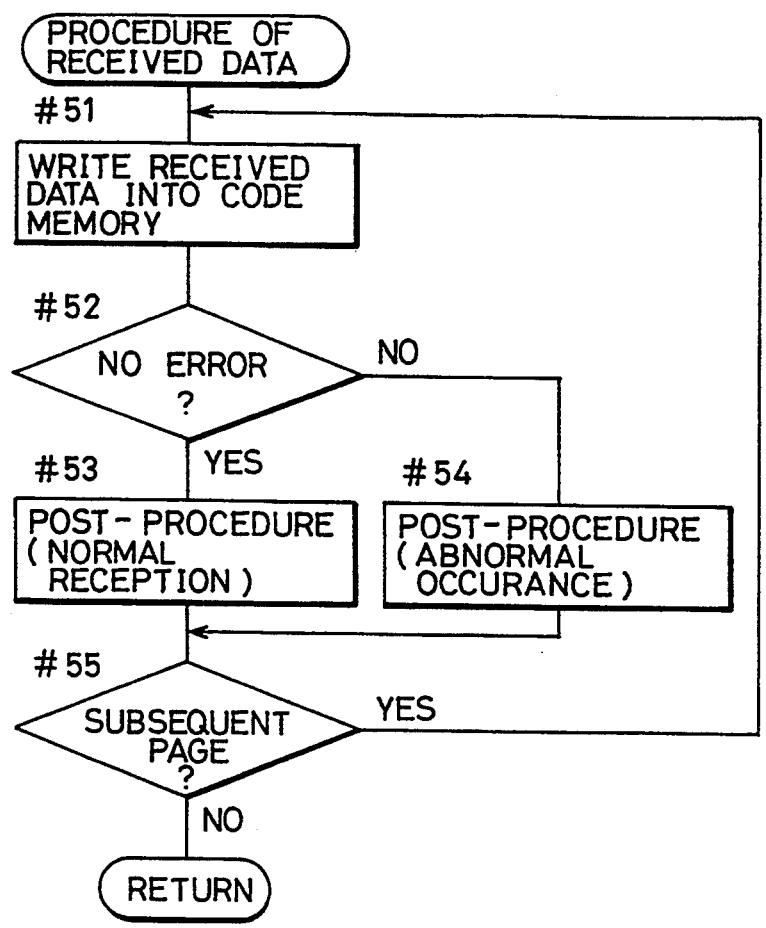
FIG. 12 is a flow chart of a receiving data procedure.

FIG. 12 is a flow chart of the receiving data procedure of FIG. 8.

The received compressed data is written into code memory 136 (step #51). At step #52, the presence of an error is checked. If there is no error, the post-procedure for normal reception is carried out (step #53). If there is an error, the post-procedure for abnormality is carried out (step #54). If the received data is a subsequent page data (step #55), the program returns to step #51.

Figure 13:
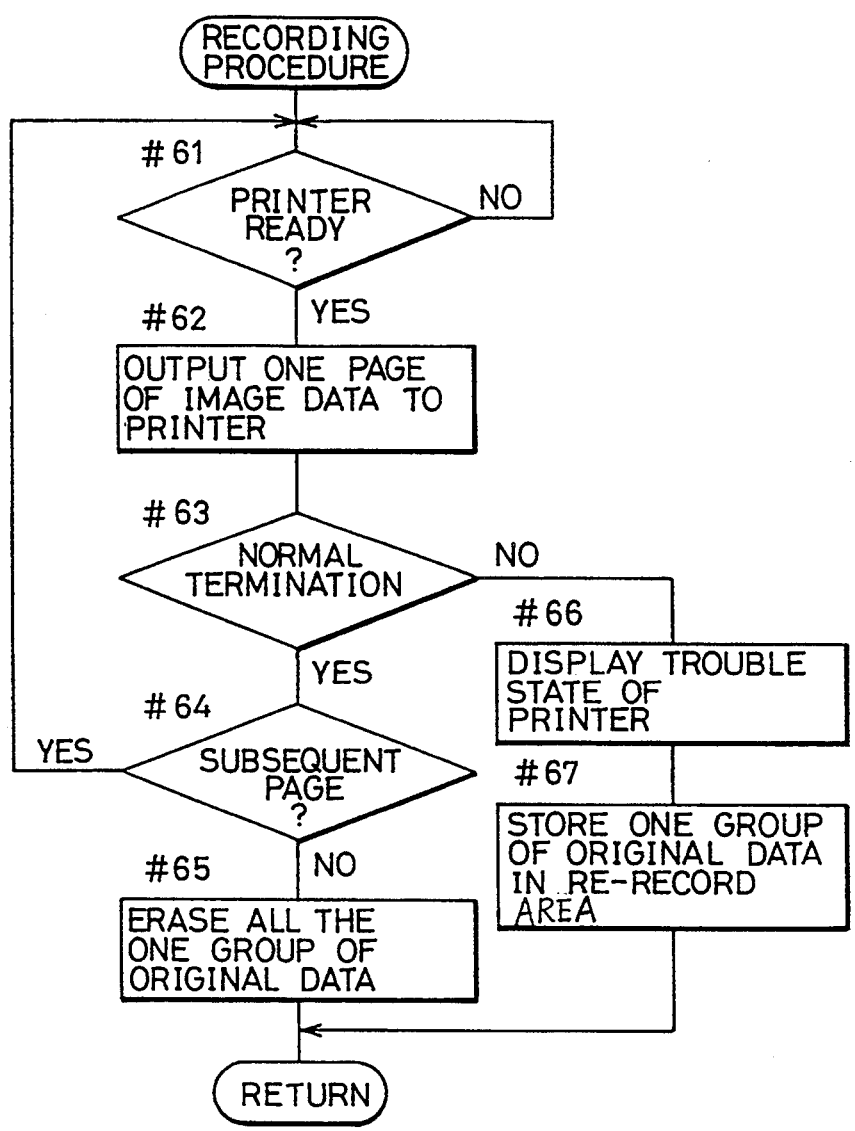
FIG. 13 is a flow chart of a recording procedure.

FIG. 13 is a flow chart of the recording procedure of FIG. 8.

Waiting is conducted for image forming system 70 to attain a printer ready state which allows the initiation of the electrophotographic process (step #61). One page of the received data expanded at encoder 146 and written into image memory 156 is read out and transmitted to printing processing unit 40 (step #62).

After the image data transmission terminates normally, the program returns to step #61 when there is image data for a subsequent page. If there is no image data of a subsequent page, the data corresponding to one transmission, i.e. all the data corresponding to a group of originals are all erased (step #63–step #65).

If NO at step #63, a procedure is executed for displaying on operation panel OP the state of trouble of the printer unit (i.e. optical system 60 and image forming system 70) (step #66). The data corresponding to a group of originals are stored into a memory region for re-recording in image memory 156 (step #67).

According to the above described embodiment, image information is transmitted according to the image reproduction function of the receiving station, so that transmission will not be inhibited even if reproduction of a two-color image is not possible at the receiving station. Therefore, a memory transmission method of a two-color image can be included in the transmission. This means that broadcasting (multi-calling) transmission of a two-color image can be carried out irrespective of the image reproduction function of each receiving station.

Since compressed data corresponding to a first color (black) and a second color (red) are stored independently in code memory 136 in the above-described embodiment, single-color mode and two-page mode requires only the operation of reading out and transmitting predetermined data from code memory 136 without the need to generate new data in transmitting image information to a receiving station where only single color reproduction is possible.

According to the above described embodiment, one of the three types of mode can be selected as a transmission mode when a two-color image reproduction is not possible at the receiving station, so that transmission can be carried out effectively according to the contents of the original and the object of the transmission.

Although the transmission/reception of a two-color image of black and red is described in the above embodiment, image transmission/reception can be carried out of a combination of arbitrary two colors such as black and blue, or blue and red.

Although a method and apparatus of transmitting image data by calling up a receiving station at step #4 after the completion of reading out an original image at step #3 was described in the above embodiment, the procedures are not limited to these procedures. For example, the procedures of step #3 and step #4 may be initiated at the same time and may be carried out in parallel. The pre-procedure of step #21 requires a relatively long time period since it includes the procedure of calling up a receiving station and identifying the state of the receiving station. It is possible to complete the procedure of step #3 during the procedure of step #21 when the procedure time of step #3 is shorter than that of step #21 to immediately transmit image data after completion of the procedure of step #21. If the procedure time of step #3 is longer than step #21, a delay step may be provided to wait for the completion of procedure step #3 between step #21 and step #22. This provision of a delay step allows reduction in the procedure time required for step #3 or for step #21.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile transmission method of transferring image data from a sending station to a receiving station through a communication line, the method comprising the steps of:

reading an image of an original which contains a first color portion and a second color portion, generating a first image data corresponding to the first color portion of the original and a second image data corresponding to a second color portion of the original, and storing the first image data and the second image data in a memory at the sending station;

calling up the receiving station and making determination whether the receiving station has a two-color image forming function or not;

if the receiving station has the two-color image forming function, sending the first image data and the second image data from the sending station to the receiving station so as to form a two-color copy of the original at the receiving station; and if the receiving station does not have the two-color image forming function, sending the first image data from the sending station to the receiving station without sending the second image data, so as to form a single-color copy corresponding to the first color portion of the original at the receiving station.

2. The method as claimed in claim 1, wherein the receiving station is called up after the first image data and the second image data have been stored in the memory.

3. The method as claimed in claim 1, wherein the receiving station is called up during the first image data and the second image data are being generated.

4. The method as claimed in claim 1, wherein the receiving station is called up during the original is being read.

5. The method as claimed in claim 1, wherein the receiving station is called up during the first image data and the second image data is being stored in the memory.

6. A facsimile transmission method of transferring image data from a sending station to a receiving station through a communication line, the method comprising the steps of:

reading an image of an original document which contains a first color portion and a second color portion, generating a first image data corresponding to the first color portion of the original and a second image data corresponding to a second color portion of the original, and storing the first image data and the second image data in a memory at the sending station;

calling up the receiving station and making determination whether the receiving station has a two-color image forming function or not;

if the receiving station has the two-color image forming function, sending the first image data and the second image data from the sending station to the receiving station so as to form a two-color copy of the original at the receiving station; and if the receiving station does not have the two-color image forming function, sending the first image data from the sending station to the receiving station so as to form a single-color copy corresponding to the first color portion of the original on a first copy sheet at the receiving station, and sending the second image data from the sending station to the receiving station so as to form another single-color copy corresponding to the second color portion of the original on a second copy sheet at the receiving station.

7. The method as claimed in claim 6, wherein the receiving station is called up after the first image data and the second image data have been stored in the memory.

8. The method as claimed in claim 6, wherein the receiving station is called up during the first image data and the second image data are being generated.

9. The method as claimed in claim 6, wherein the receiving station is called up during the original is being read.

10. The method as claimed in claim 6, wherein the receiving station is called up during the first image data and the second image data are being stored in the memory.

11. A facsimile transmission method of transferring image data from a sending station to a receiving station through a communication line, the method comprising the steps of:

reading an image of an original document which contains a first color portion and a second color portion, generating a first image data corresponding to the first color portion of the original and a second image data corresponding to a second color portion of the original, and storing the first image data and the second image data in a memory at the sending station;

calling up the receiving station and making determination whether the receiving station has a two-color image forming function or not;

if the receiving station has the two-color image forming function, sending the first image data and the second image data from the sending station to the receiving station so as to form a two-color copy of the original at the receiving station; and if the receiving station does not have the two-color image forming function, forming a third image data from the first image data and the second image data and sending the third image data from the sending station to the receiving station so as to form a single-color copy corresponding to the first color portion and the second color portion of the original on a single copy sheet at the receiving station.

12. The method as claimed in claim 11, wherein the receiving station is called up after the first image data and the second image data have been stored in the memory.

13. The method as claimed in claim 11, wherein the receiving station is called up during the first image data and the second image data are being generated.

14. The method as claimed in claim 11, wherein the receiving station is called up during the original is being read.

15. The method as claimed in claim 11, wherein the receiving station is called up during the first image data and the second image data are being stored in the memory.

16. A facsimile apparatus for transferring image data to a receiving station through a communication line, the apparatus comprising:

a memory;

image reading means for reading an image of an original which contains a first color portion and a second color portion, generating a first image data corresponding to the first color portion of the original and a second image data corresponding to a second color portion of the original, and storing the first image data and the second image data in the memory;

determination means for determining whether the receiving station has a two-color image forming function or not;

first transmission control means, which is operable if the receiving station has the two color image forming function, for sending the first image data and the second image data stored in the memory to the receiving station so as to form a two-color copy of the original at the receiving station; and second transmission control means, which is operable if the receiving station does not have the two-color image forming function, for sending the first image data stored in the memory to the receiving station without sending the second image data so as to form a single-color copy corresponding to the first color portion of the original at the receiving station.

17. The apparatus as claimed in claim 16, further comprising calling means for calling up the receiving station.

18. The apparatus as claimed in claim 17, wherein said calling means call up the receiving station during the operation of said image reading means.

19. The apparatus as claimed in claim 17, wherein said calling means call up the receiving station after said image reading means have completed the operation thereof.

20. A facsimile apparatus for transferring image data to a receiving station through a communication line, the apparatus comprising:

a memory;

image reading means for reading an image of an original which contains a first color portion and a second color portion, generating a first image data corresponding to the first color portion of the original and a second image data corresponding to a second color portion of the original, and storing the first image data and the second image data in the memory;

determination means for determining whether the receiving station has a two-color image forming function or not;

first transmission control means, which is operable if the receiving station has the two-color image forming function, for sending the first image data and the second image data stored in the memory to the receiving station so as to form a two-color copy of the original at the receiving station; and second transmission control means, which is operable if the receiving station does not have the two-color image forming function, for sending the first image data stored in the memory to the receiving station so as to form a single-color copy corresponding to the first color portion of the original on a first copy sheet at the receiving station and also sending the second image data stored in the memory to the receiving station so as to form another single-color copy corresponding to the second color portion of the original on a second copy sheet at the receiving station.

21. The apparatus as claimed in claim 20, further comprising calling means for calling up the receiving station.

22. The apparatus as claimed in claim 21, wherein said calling means call up the receiving station during the operation of said image reading means.

23. The apparatus as claimed in claim 21, wherein said calling means call up the receiving station after said image reading means have completed the operation thereof.

24. A facsimile apparatus for transferring image data to a receiving station through a communication line, the apparatus comprising:

a memory;

image reading means for reading an image of an original which contains a first color portion and a second color portion, generating a first image data corresponding to the first color portion of the original and a second image data corresponding to a second color portion of the original, and storing the first image data and the second image data in the memory;

determination means for determining whether the receiving station has a two-color image forming function or not;

first transmission control means, which is operable if the receiving station has the two color image forming function, for sending the first image data and the second image data stored in the memory to the receiving station so as to form a two-color copy of the original at the receiving station; and second transmission control means, which is operable if the receiving station does not have the two-color image forming function, for forming a third image data from the first image data and the second image data stored in the memory and sending the third image data to the receiving station so as to form a single-color copy corresponding to the first color portion and the second color portion of the original on a single copy sheet at the receiving station.

25. The apparatus as claimed in claim 24, further comprising calling means for calling up the receiving station.

26. The apparatus as claimed in claim 25, wherein said calling means call up the receiving station during the operation of said image reading means.

27. The apparatus as claimed in claim 25, wherein said calling means call up the receiving station after said image reading means have completed the operation thereof.

* * * * *